United States Patent [19]

Meyers

[11] Patent Number: 5,500,702

[45] Date of Patent: Mar. 19, 1996

[54] DEVICE FOR IDENTIFYING A PERIMETER OF A SCENE TO BE RECORDED BY AN IMAGE RECORDING APPARATUS

[75] Inventor: Mark M. Meyers, Hamlin, N.Y.

[73] Assignee: Eastman Kodak Company, Rochester, N.Y.

[21] Appl. No.: 250,067

[22] Filed: May 27, 1994

[51] Int. Cl.$^6$ .................................................. G03B 13/20
[52] U.S. Cl. ........................ 354/165; 354/166; 354/219; 352/131; 352/171
[58] Field of Search .................................... 354/165, 166, 354/219; 352/131, 171

[56] References Cited

U.S. PATENT DOCUMENTS

| | | | |
|---|---|---|---|
| 2,816,475 | 12/1957 | Waller et al. | |
| 3,402,635 | 9/1968 | Jacknau et al. | |
| 3,442,193 | 5/1969 | Pagel. | |
| 4,777,501 | 10/1988 | Caimi et al. | 354/64 |
| 4,876,816 | 10/1989 | Triplett | 42/103 |
| 4,918,476 | 4/1990 | Tejima | 354/221 |
| 4,963,017 | 10/1990 | Schneiter et al. | 356/1 |
| 5,038,162 | 8/1991 | Tejima | 354/221 |
| 5,059,019 | 10/1991 | McCullough | 352/131 |
| 5,189,463 | 2/1993 | Capper et al. | 354/403 |
| 5,305,047 | 4/1994 | Hayakawa et al. | 354/403 |

FOREIGN PATENT DOCUMENTS

| | | | |
|---|---|---|---|
| 182428 | 2/1936 | Germany. | |
| 2252836 | 8/1992 | United Kingdom | G03B 15/035 |
| WO93/13452 | 7/1993 | WIPO | G03B 13/02 |

Primary Examiner—Monroe H. Hayes
Attorney, Agent, or Firm—David A. Howley

[57] ABSTRACT

A device for identifying a perimeter of a scene to be recorded by an image recording apparatus, such as a camera, includes one or more laser diodes for emitting visible radiation which can be formed into a plurality of beams. The beams are arranged to impinge on a scene substantially along a perimeter of the scene. The visible light impinging on the scene allows a camera operator to identify the scene which is within the camera's field of view without the camera operator having to look through the camera's viewfinder.

7 Claims, 5 Drawing Sheets

DEVICE FOR IDENTIFYING A PERIMETER OF A SCENE TO BE RECORDED BY AN IMAGE RECORDING APPARATUS

FIELD OF THE INVENTION

The invention relates generally to the field of image recording apparatus and, in particular, to cameras. More specifically, the invention relates to a device for identifying a perimeter of a scene to be recorded by an image recording apparatus.

BACKGROUND OF THE INVENTION

PCT Publication No. WO 93/13452, published Jul. 8, 1993 in the name of Capper, discloses a camera having an aiming mechanism. When a camera shutter button is partially depressed, the aiming mechanism produces a visible beam of light, for example a beam of laser light, which reflects off an object to be photographed, thereby indicating to the camera operator where the camera is aimed. The beam of laser light allows a camera operator to record images without having to look through a camera viewfinder to determine where the camera is aimed.

One of the chief advantages of a laser designator is that a high intensity spot is projected over a large distance with the divergence of the beam being minimal. The high brightness of the laser spot makes it easy to recognize in what may be a busy scene being photographed.

The Capper reference discloses one or more moving mirrors for reflecting the light beam in such a way that the light beam traces a predetermined region, such as a circle or rectangle. The speed of trace and the persistence of the light give the illusion of a visible circle or rectangle framing the field of view of the camera. As such, a camera operator is able to determine what scene will be recorded by the camera when the shutter button is pressed without having to look through the viewfinder. Such a reflecting mechanism uses moving mirrors and motors to move the mirrors. Alternatively, the light emitting device may itself be moved to direct the light beam.

Utilizing motors to move mirrors or light emitters to frame the field of view increases the cost, power consumption, complexity and size of the camera. Further, such moving parts will wear with age, becoming less accurate in framing the field of view and eventually wearing out.

SUMMARY OF THE INVENTION

The present invention is directed to overcoming one or more of the problems set forth above. Briefly summarized, according to one aspect of the present invention, a device for identifying a perimeter of a scene to be recorded by an image recording apparatus includes means for effecting a plurality of visible radiation beams which are arranged to impinge on a scene substantially along a perimeter of the scene. Also included are means for activating the beam effecting means.

As such, the beams can identify the perimeter of the scene which will be recorded by the camera without the necessity of motors, moving mirrors or moving radiation emitters.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
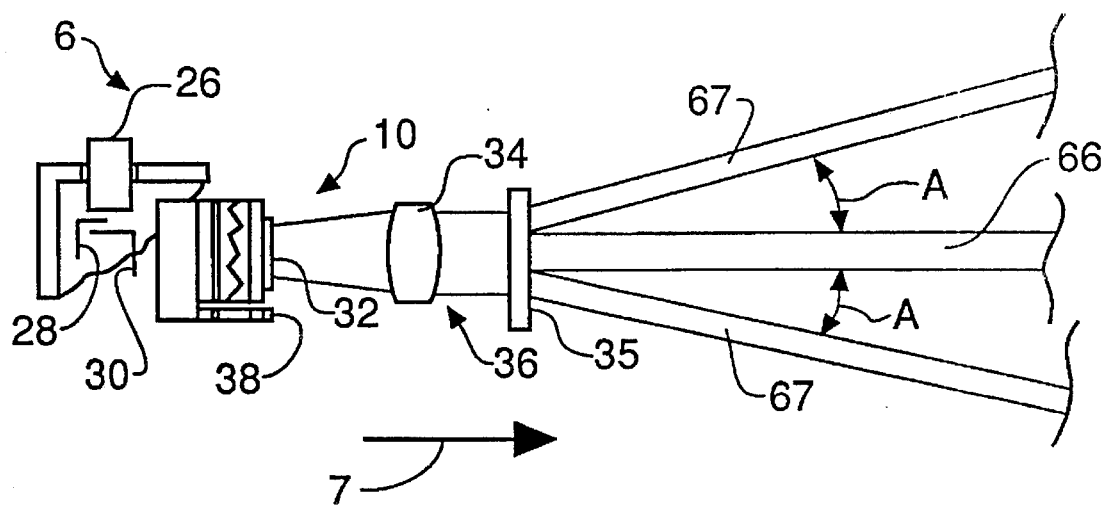
FIG. 1 is a schematic side view of a portion of a camera including a scene perimeter identifying device.

Referring now to FIG. 1, a preferred embodiment of the invention is illustrated in an image recording apparatus such as a camera 6. Camera 6 includes a perimeter identifying device 10. The camera has an optical axis 7, is automatic in its operation, and is activated by a shutter button 26 that is depressed to move through two positions engaging first and second switches 28 and 30, respectively.

The first switch 28, connected to a camera power supply such as a battery (not shown), activates the perimeter identifying device which emits a visible laser light that indicates to a camera operator the scene which is within the camera's field of view. The camera power supply is connected to a visible light emitter. As such, the camera operator need not look through a camera viewfinder to determine what scene is in the camera's field of view. The second switch 30 activates a camera exposure operation to record an image of the scene within the camera's field of view.

The perimeter identifying device 10 projects a plurality of beams of radiation in a wavelength and intensity suitable for visibly designating the perimeter of a scene to be photographed. A surface or edge emitting indium-gallium-aluminum phosphide (In(GaAl)P) laser diode 32 is depicted as the visible light emitter in the preferred embodiment with an optional collimating lens 34. The laser preferably is driven at one-half of a milliwatt (½ mw) and is modulated at one kilohertz (1 khz). The combination laser and lens 34 projects a narrow beam 36 of radiation. Typically, the visible radiation appears red in color and is emitted at a wavelength of six hundred and thirty nanometers (630 nm), with a bandwidth of approximately one to twenty nanometers (120 nm). Lasers emitting other colored light, such as blue or green light, can also be used in the present invention The output of the laser diode 32 is monitored by an adjacent photodetector 38, producing a signal representing the intensity of the laser beam.

Figure 2:
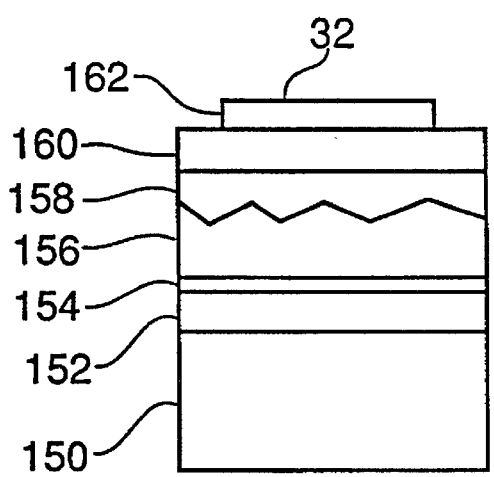
FIG. 2 is a schematic side view of a laser diode used in the perimeter-identifying device of FIG. 1.

Turning now to FIG. 2, the preferred embodiment of laser diode 32 is a surface emitting distributed feedback (DFB)

laser grown on a Gallium Arsenide (GaAs) substrate 150, which incorporates an N type indium gallium aluminum phosphide ( In (GaAl) P) cladding layer 152, an (InGaP/In(GaAl)P) quantum well active layer 154, and a P type (In (GaAl) P) separate confinement layer 156. A second order distributed feedback grating 158 is formed on the confinement layer 156, and is overgrown with a p type (In(GaAl)P) cladding layer 158 and a P type GaAs contact layer 160. The surface emitting electrode is represented at 162.

Although a surface emitting laser is depicted, edge emitting lasers, light emitting diodes and other visible emitters also might be employed according to this preferred embodiment.

Figure 3:
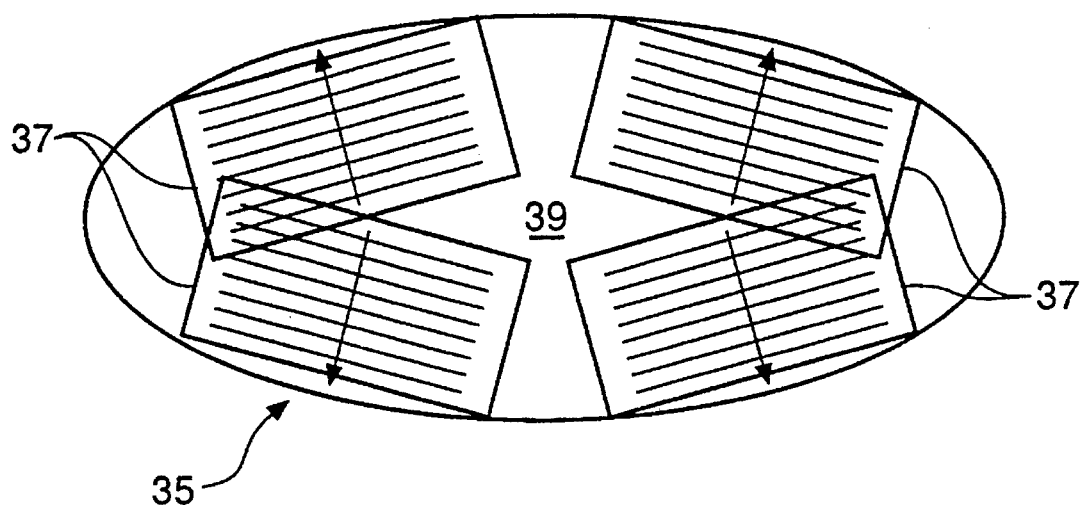
FIG. 3 is a schematic representation of a holographic optical element used in the perimeter identifying device of FIG. 1.

Referring to FIGS. 1 and 3, after passing through lens 34, beam 36 is incident on a holographic optical element (HOE) 35 which includes four diffraction gratings 37 around which are clear spaces 39. The light incident on clear spaces 39 of HOE 35 is simply transmitted through the clear space without altering the path of the light. As such, a light beam 66 projects parallel to optical axis 7.

The grating vector of each diffraction grating 37 is oriented to deflect the fraction of the laser beam incident upon it at an angle relative to optical axis 7. This angle includes a vertical component A which is, for example, 19 degrees and a horizontal component (not shown: into and out of the paper on which FIG. 1 is located) which is, for example, 27 degrees. The four diffracted beams 67 (two are hidden from view behind beams 67 in FIG. 1) of the laser beam diverge from each other at a rate which is similar to the camera's field of view. Beams 66 and 67 then propagate until they are incident on a scene to be recorded.

The properties and methods of manufacturing holographic optical elements of the type used in the preferred embodiment are disclosed in my U.S. Pat. No. 5,039,183, issued Aug. 13, 1991; and an article entitled "Designing and Constructing Thick Holographic Optical Elements," published in Applied Optics, Volume 17, Number 8, dated Apr. 15, 1978. The disclosures of the last mentioned patent and publication hereby are incorporated by reference into this specification.

Figure 4:
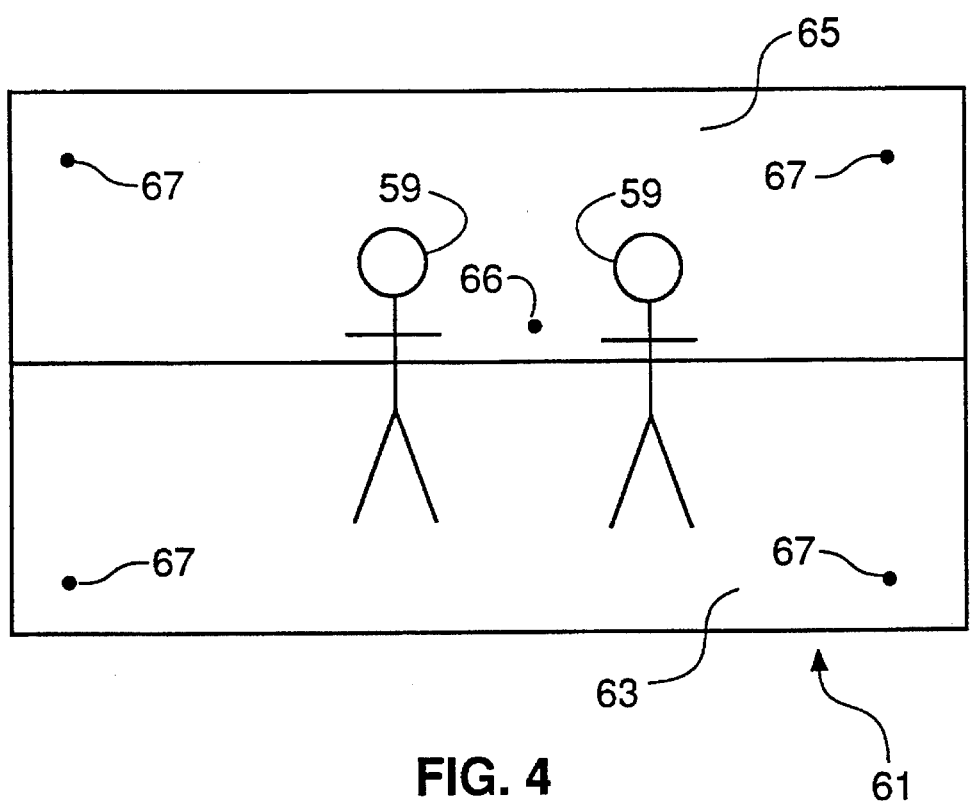
FIG. 4 is a schematic representation of a scene with the perimeter identified by spots of light in the corners of the perimeter of the scene.

Turning now to FIG. 4, a scene is represented which a camera operator desires to photograph. Two people 59 are standing in a room 61 having a floor 63 and a wall 65. When a camera operator presses camera shutter 26 to close switch 28 (FIG. 1), visible beams 66, 67 reflect off of the scene and identify respectively the center of the scene and corners of the perimeter of the scene which is in the camera's field of view.

The camera operator will thereby know when figures 59 are within the camera's field of view. Consequently, the camera operator can record an image of a scene without having to look through a camera viewfinder while insuring that the portion of the scene desired to be captured is located within the image capture area. The framing of an image area is done without moving mirrors, motors etc. and therefore greatly simplifies the framing operation.

Figure 5:
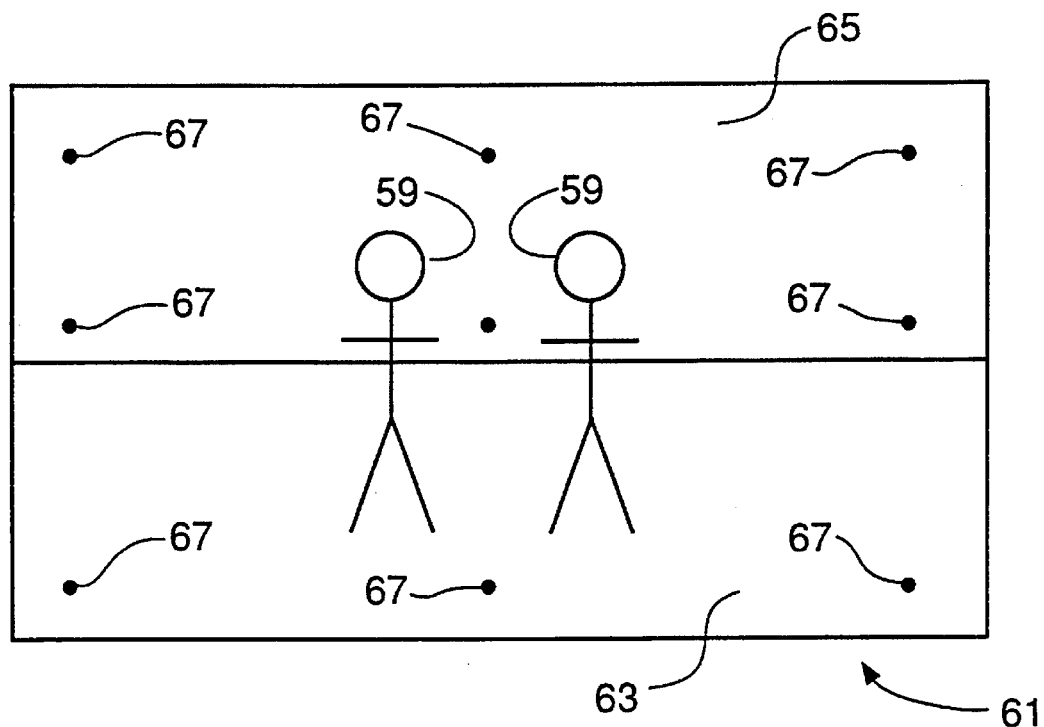
FIG. 5 is a schematic representation of a scene with the perimeter identified by spots of light in the corners and midway between the corners of the perimeter of the scene.

Referring to FIG. 5, additional beams 67 can be projected onto the scene by incorporating additional grating vectors 37 into HOE 35 (see FIG. 3). In this case, four more beams are provided at the midpoints between the borders. These additional beams will further assist a camera operator in discerning what scene is within the cameras field of view. Of course, as little as two perimeter beams could be used to identify the perimeter of the scene. For example, only two beams need be used to identify the left and right, or top and bottom perimeter of a scene. Two diagonally opposed corner beams can be used to indicate to the camera operator the left, right, top and bottom perimeter of a scene.

Figure 6:
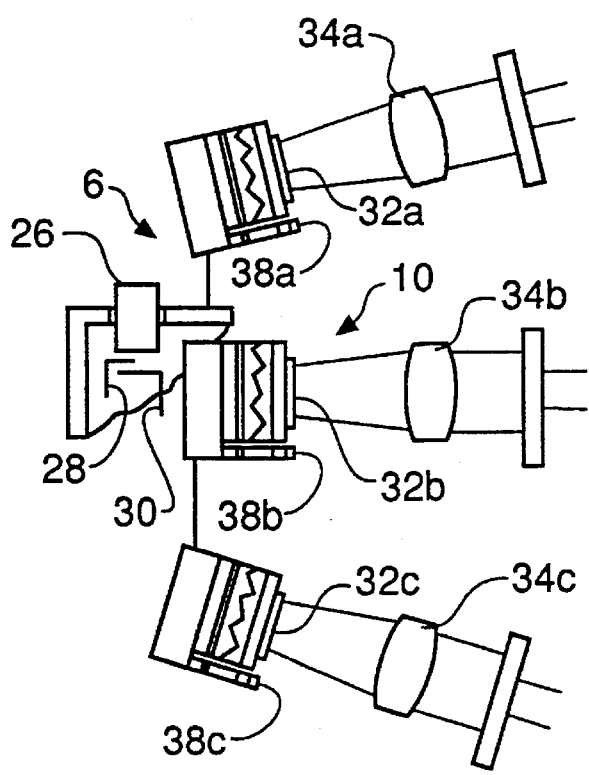
FIG. 6 is a schematic representation of an alternative embodiment of a scene perimeter identifying device.

An alternative embodiment of the invention will be described with reference to FIG. 6. In this embodiment, five laser diodes (two are hidden from view behind diodes 32*a* and *c*) are used to emit five radiation beams. Each beam is collimated respectively by a collimating lens. As with the previous embodiment, the beams diverge from each other at an angle such that the beams will impinge on a scene at a perimeter of the scene within the camera's field of view. In this embodiment, an HOE is not necessary, because the radiation beams are separate and properly oriented when they are emitted due to the orientation of the laser diodes.

Figure 7:
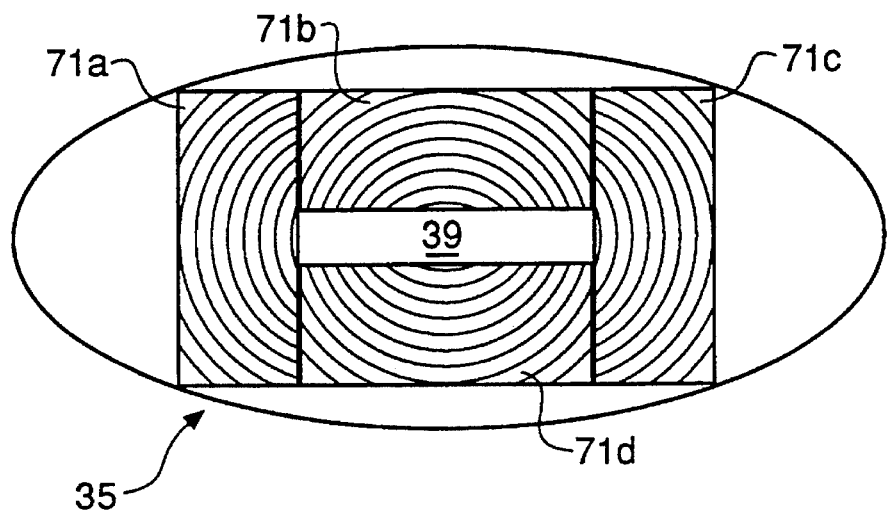
FIG. 7 is a schematic representation of an alternative holographic optical element used in the perimeter identifying device of FIG. 1.

Another embodiment of the invention will be described with reference to FIGS. 7 and 8. FIG. 7 represents HOE 35, used in the FIG. 1 embodiment, in which diffraction gratings 37 have been replaced by diffractive optical elements (DOEs) 71*a–d*. The DOEs have anamorphic optical properties and are designed such that visible light passing through each DOE will be focused to expand in a first direction parallel to the long side of the DOE and not expand in a second direction perpendicular to the first direction. Further, the DOEs bend the light beam such that the light beam diverges from the camera's optical axis.

The result is a "line" of light from each DOE which gets longer as the light propagates away from the HOE. For example, horizontal lines of light projecting from DOEs 71*b* and d each diverge from the camera's optical axis by 19 degrees while each horizontal line will expand in length at the rate of 54 degrees. Vertical lines of light projecting from DOEs 71*a* and *c* each diverge from the camera's optical axis by 27 degrees while each vertical line expands in length at the rate of 38 degrees. The lines of light diverge from each other at angles similar to the field of view of the camera. As with the HOE in FIG. 3, the HOE in FIG. 7 includes a transparent, nonfocusing space 39. Light passing through space 39 will not be diffracted and will propagate parallel to the optical axis. Cylindrical lenses can be used instead of DOEs 71*a–d*.

The result is a light frame 73*a–d* (see FIG. 8) projected from the camera which expands at a rate similar to the camera's field of view as the frame emanates away from the camera. Light beam 66 has passed through clear space 39 and represents the center of the scene.

The light frame reflects off of the scene and allows the camera operator to determine which scene is within the camera's field of view without having to look through the camera's viewfinder. Of course, as little as two lines of light could be used to identify borders of the scene. For example, only two lines of light need to be used to identify the left and right, or top and bottom borders of a scene. Alternatively, a horizontal and vertical line of light can be used to indicate to the camera operator the left, right, top and bottom borders of a scene.

Figure 9:
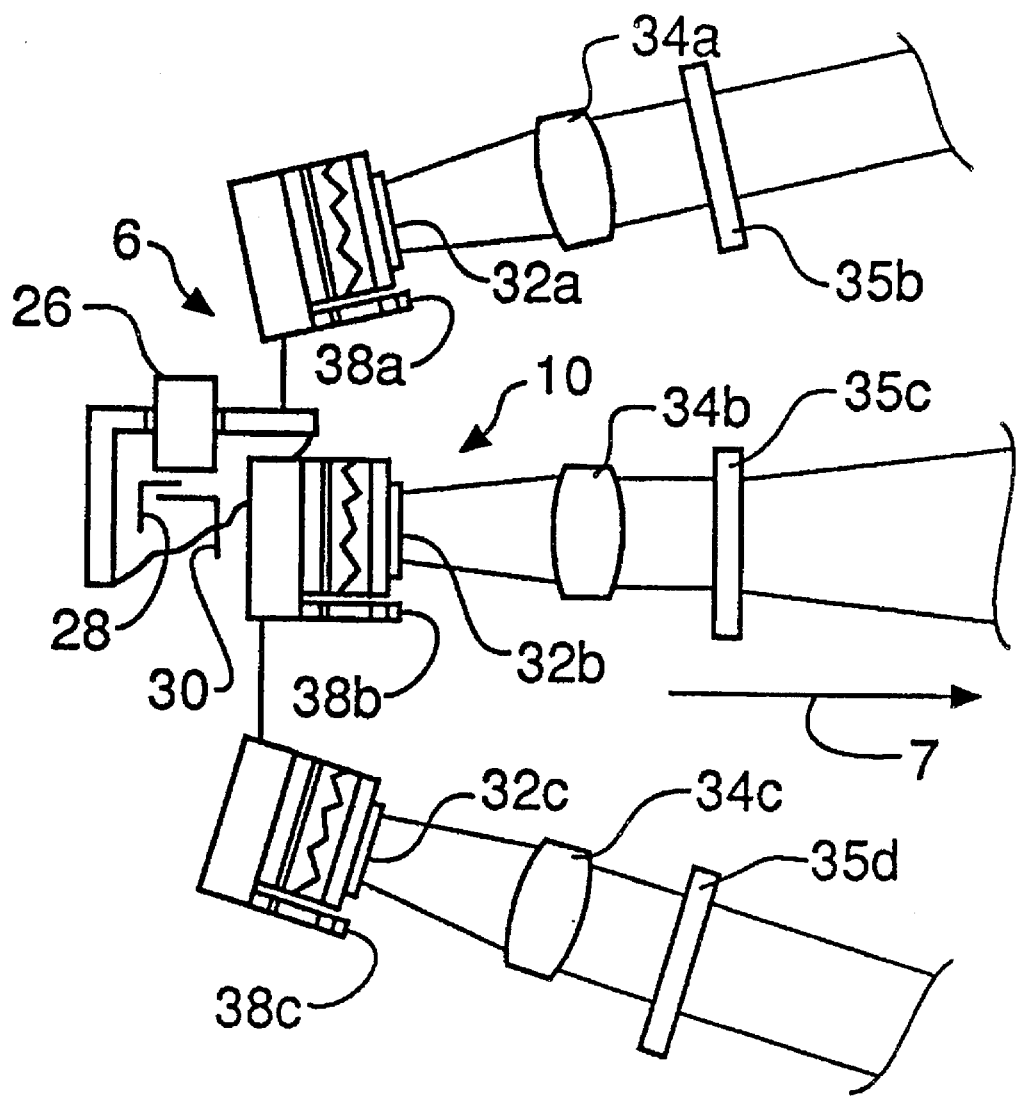
FIG. 9 is a schematic representation of an alternative embodiment of a scene perimeter identifying device.

A still further embodiment of the invention will be described with reference to FIG. 9. As with FIG. 6, five laser diodes are used (two are hidden behind diode 32*b*). Four HOEs 35 are utilized to spread all but the center radiation beam (hidden from view) into lines of light. HOE 35*b* includes only a DOE similar to DOE 71*b* (see FIG. 7), HOE 35*c* includes only a DOE similar to DOE 71*c* and HOE 35*d* includes only a DOE similar to 71*d*. The DOEs differ from those in FIG. 7 in that they only need to spread the radiation beam into a line of light. The DOEs do not need to bend the beams relative to the camera's optical axis because each laser diode is already properly oriented.

Figure 8:
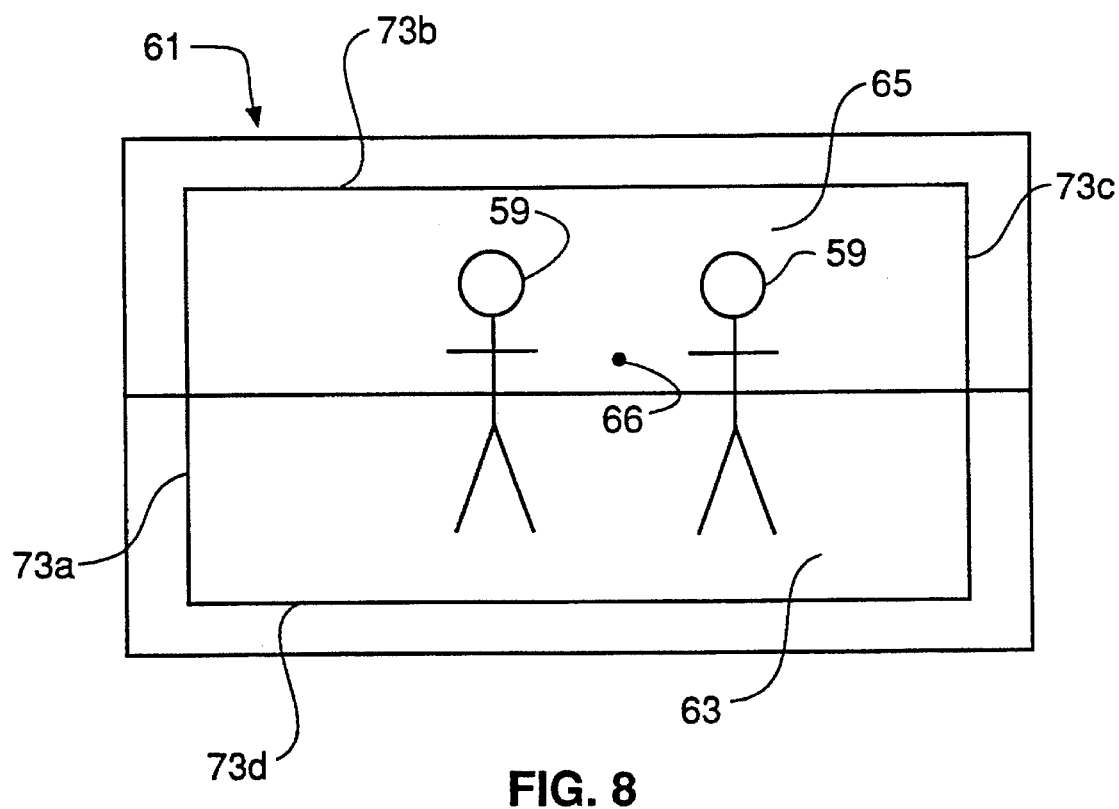
FIG. 8 is a schematic representation of a scene with the perimeter identified by a light frame which reflects from the scene at the perimeter of the scene.

The result is the same as in FIG. 8: a frame of light which impinges on a scene on a perimeter of the scene within the camera's field of view. In FIG. 9, the light beam emanating from HOE 35c is (a) expanding in a plane parallel to the paper on which FIG. 9 is located and (b) not expanding perpendicular to the paper on which FIG. 9 is located. The light beams emanating from HOEs 35b and *d* are (a) not expanding in a plane parallel to the paper and (b) expanding perpendicular to the paper on which FIG. 9 is located.

All of the above embodiments can be formed holographically in volume holographic materials such as dichromated gelatin, in surface relief materials such as photoresist or they can be formed using a microlithographic type patterning and etching process (called binary or diffractive elements in the literature). The diffractive elements can also be formed as masters which are then used to replicate or injection mold production quantities of parts.

While the invention has been described in connection with preferred an alternative embodiments, other modifications and applications will occur to those skilled in the art. The claims should be interpreted to fairly cover all such modifications and applications within the true spirit and scope of the invention.

PARTS LIST FOR FIGS. 1–7

- A - Angle
- 6 - Camera.
- 10 - Perimeter Designator.
- 26 - Shutter button.
- 28 - First switch.
- 30 - Second switch.
- 32 - Laser diode.
- 34 - Collimating lens.
- 35 - HOE
- 36 - Narrow beam.
- 37 - Diffractive DOE.
- 39 - Clear space
- 38 - Monitoring photodetector.
- 59 - People.
- 61 - Room.
- 63 - Floor.
- 65 - Wall.
- 66 - Light beam.
- 67 - Light beams.
- 71*a–d*- Anamorphic DOE
- 73*a–d*- Lines of Light
- 150 - Substrate.
- 152 - Cladding layer.
- 154 - Active layer.
- 156 - Confinement layer.
- 158 - Grating.
- 160 - Contact layer.
- 162 - Electrode.

I claim:

1. A device for identifying a perimeter of a scene to be recorded by an image recording apparatus, comprising:

means for effecting a plurality of visible radiation beams which are arranged to impinge on a scene substantially along a perimeter of the scene, said beam effecting means including a radiation emitter for emitting visible radiation and means for dividing visible radiation emitted from said emitter into a plurality of visible radiation beams, said dividing means including one or more holographic and/or diffractive optical elements; and means for activating said beam effecting means.

2. The scene perimeter identifying device of claim 1, wherein said beam effecting means includes a plurality of radiation emitters for emitting a plurality of visible radiation beams.

3. The scene perimeter identifying device of claim 1, wherein said image recording apparatus is a camera.

4. The scene perimeter identifying device of claim 1, wherein said beam effecting means includes laser light emitting means to effect a plurality of visible radiation beams.

5. The scene perimeter identifying device of claim 1, wherein said beam effecting means includes means for making a plurality of visible radiation beams impinge on a scene at corners of a perimeter of a scene.

6. The scene perimeter identifying device of claim 1, further comprising:

means for focusing a plurality of visible radiation beams to make the beams form a continuous frame along a perimeter of a scene.

7. The scene perimeter identifying device of claim 1, further comprising:

means for focusing a plurality of visible radiation beams to make the beams completely fill at least two sides of a perimeter of a scene.

* * * * *